United States Patent
Yang

(10) Patent No.: US 7,898,631 B2
(45) Date of Patent: Mar. 1, 2011

(54) DISPLAY DEVICE WITH CIRCUIT UNIT, INSULATION FILM AND REFLECTIVE FILMS IN THE SEAL REGION

(75) Inventor: Yong-Ho Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 315 days.

(21) Appl. No.: 11/226,716

(22) Filed: Sep. 13, 2005

(65) Prior Publication Data

US 2006/0066604 A1 Mar. 30, 2006

(30) Foreign Application Priority Data

Sep. 24, 2004 (KR) .................. 10-2004-0077041

(51) Int. Cl.
 *G02F 1/1339* (2006.01)
 *G02F 1/1345* (2006.01)
(52) U.S. Cl. .............. 349/153; 349/149; 349/152; 349/154; 349/190
(58) Field of Classification Search .......... 349/149, 349/152–154, 190; 156/275.5
See application file for complete search history.

(56) References Cited

U.S. PATENT DOCUMENTS

| 6,284,087 B1 * | 9/2001 | von Gutfeld et al. ..... 156/275.5 |
| 2002/0196393 A1 * | 12/2002 | Tashiro et al. ............... 349/106 |
| 2003/0035081 A1 * | 2/2003 | Jung et al. .................. 349/152 |
| 2004/0150771 A1 * | 8/2004 | Lee ............................ 349/114 |

* cited by examiner

*Primary Examiner*—David Nelms
*Assistant Examiner*—Jessica M Merlin
(74) *Attorney, Agent, or Firm*—Innovation Counsel LLP

(57) ABSTRACT

A display device for improving a binding force between upper and lower substrates and a method of manufacturing the display device are presented. The display device includes a display panel having a display area, a sealant area enclosing the display area, a first peripheral area positioned outside the sealant area and a second peripheral area disposed between the display area and the sealant area. A gate driver is formed in the display area and the binding member is formed in the sealant area. The reflective member is formed in at least one of the first peripheral area and the second peripheral area to guide the light to the binding member and cure the binding member. With the reflective member, an increased amount of light is provided to the binding member so that the binding member is fully cured to couple the upper and lower substrates to each other.

12 Claims, 16 Drawing Sheets

DISPLAY DEVICE WITH CIRCUIT UNIT, INSULATION FILM AND REFLECTIVE FILMS IN THE SEAL REGION

CLAIM FOR PRIORITY

This application claims priority under 35 USC §119 to Korean Patent Application No. 2004-77041, filed on Sep. 24, 2004, the content of which is herein incorporated by reference in its entirety for all purposes.

BACKGROUND OF THE INVENTION

1. Field of the Invention

The present invention relates to a display device and a method of manufacturing the same, and more particularly to a display device having an improved seal between upper and lower substrates and a method of manufacturing the same.

2. Description of the Related Art

Generally, a display device includes a display panel having a plurality of gate lines and a plurality of data lines, a gate driver for outputting gate signals to the gate lines and a data driver for outputting data signals to the data lines.

The gate driver and the data driver may be implemented on a chip that is mounted on the display panel. Alternatively, the gate driver may be integrated in the display panel so as to reduce a size of the display device and increase productivity.

In addition, the display panel includes an array substrate having the gate lines and the data lines, a color filter substrate that is substantially parallel to the array substrate, a liquid crystal layer positioned between the array substrate, and the color filter substrate and a sealant for binding the array substrate to the color filter substrate.

When the gate driver is integrated in the array substrate of the display panel, a parasitic capacitance may be generated between the gate driver and a common electrode formed on the color filter substrate. The parasitic capacitance is undesirable, as it may cause a malfunction of the gate driver.

The sealant may be positioned between the gate driver and the common electrode to reduce the parasitic capacitance. Typically, the sealant includes a photosetting (or light curable) material and is cured by light to seal the display panel by attaching the color filter substrate to the array substrate. Since a light blocking layer is formed on the color filter substrate formed above the gate driver, the light is generally incident on a rear side of the array substrate where there is no light blocking layer.

A disadvantage with this configuration is that when the sealant is disposed between the gate driver and the common electrode, the amount of light that is incident on the sealant is reduced by the gate driver.

As the amount of light that is incident on the sealant is reduced, the sealant is not sufficiently cured. As a result, the binding force between the array substrate and the color filter substrate is weakened. A way of binding the two substrate securely while maintaining a low parasitic capacitance between the gate driver and the common electrode is desired.

SUMMARY OF THE INVENTION

Accordingly, the present invention substantially obviates one or more problems due to limitations and disadvantages of the related art.

The present invention may includes a display device in which the binding force between upper and lower substrates is improved and a method of manufacturing the display device.

In one aspect of the present invention, a display device including a display panel, a gate driver, a binding member and a reflective member is provided. The display panel has a display area, a sealant area enclosing the display area, a first peripheral area being outside the sealant area and a second peripheral area disposed between the display area and the sealant area. The gate driver is formed in the sealant area to provide the display panel with a driving signal to display an image. The binding member is formed in the sealant area. The reflective member is formed in at least one of the first peripheral area and the second peripheral area to guide a light provided to the binding member, wherein the light cures the binding member.

In another aspect of the present invention, a display device includes a display panel and a circuit unit. The display panel includes a first substrate having a gate line and a data line, a second substrate facing the first substrate and a binding member positioned between the first and second substrates to combine the first substrate with the second substrate so that the display panel displays an image based on a driving signal. The circuit unit is formed in the first substrate, configured to output the driving signal to the gate line based on a plurality of signals received from an external device. The circuit unit includes a first circuit unit and a second circuit unit. The first circuit unit is coupled to the gate line to provide the driving signal to the gate line. The second circuit unit is spaced apart from the first circuit unit to drive the first circuit unit based on the signals provided from the exterior. The display device may further include an interconnection unit for providing the circuit unit with the signals provided from the exterior. For example, the binding member is formed to cover the interconnection unit and the second circuit unit.

In yet another aspect, the present invention provides a method of manufacturing a display device. In the method, a first substrate including a gate driver and a reflective member is formed. The gate driver is formed in a sealant area enclosing a display area and the reflective member is formed in a peripheral area adjacent to the sealant area. A binding member is formed in the sealant area. A second substrate is positioned substantially parallel to the first substrate. A is provided from a rear of the first substrate to cure the binding member and couple the first substrate with the second substrate, wherein the light is reflected by the reflective member to reach the binding member.

According to the present invention, an increased amount of light may be provided to the binding member so that the binding force between the upper and lower substrates may be improved.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EXEMPLARY EMBODIMENTS

Hereinafter, the present invention.will be explained in detail with reference to the accompanying drawings.

Figure 1:
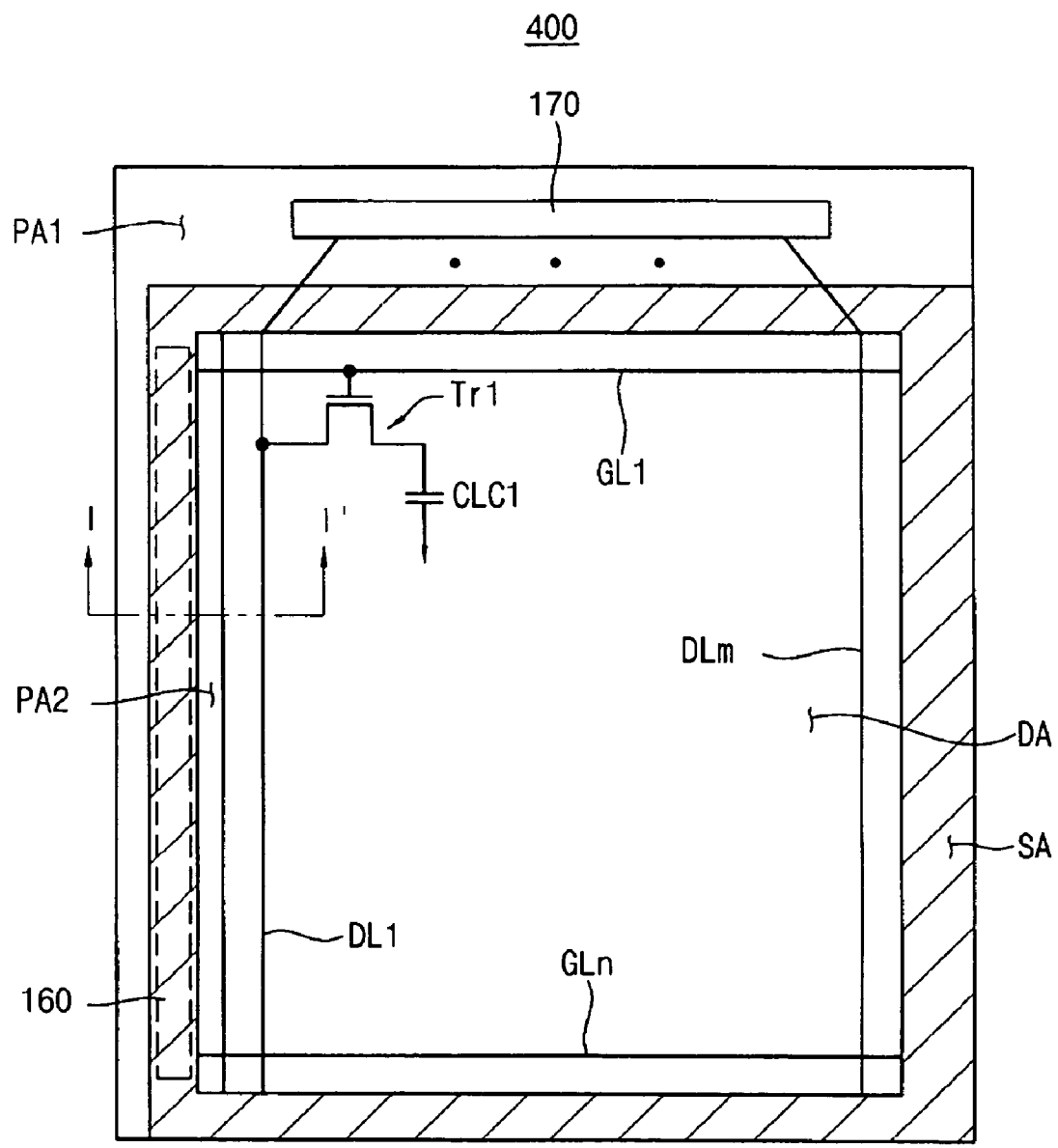
FIG. 1 is a plan view of a display device according to an exemplary embodiment of the present invention.
Figure 2:
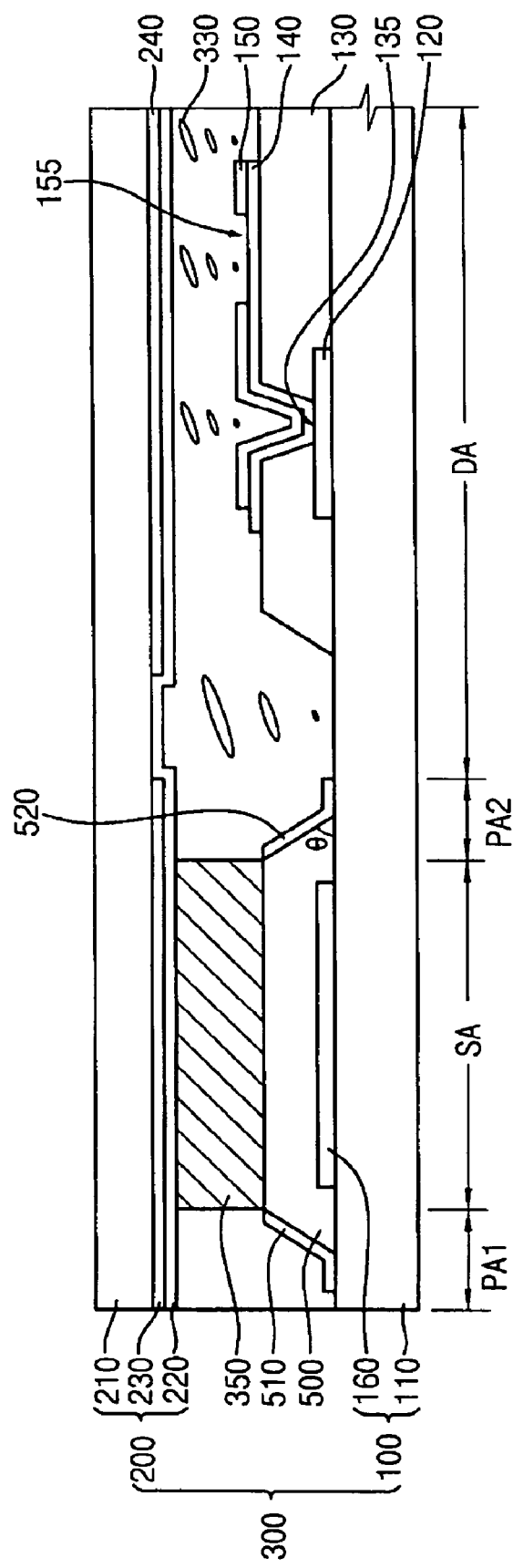
FIG. 2 is a cross sectional view taken along a line I-I' in FIG. 1.

FIG. 1 is a plan view of a display device according to an exemplary embodiment of the present invention and FIG. 2 is a cross sectional view taken along a line I-I' in FIG. 1.

Referring to FIGS. 1 and 2, the display device 400 includes a display panel 300 for displaying an image in response to first and second driving signals. The display panel 300 includes a data driver 170 and a gate driver 160 for providing the display panel 300 with the first and second driving signals, respectively.

The display panel 300 includes an array substrate 100, a color filter substrate 200 substantially parallel to the array substrate 100, a liquid crystal layer 330 positioned between the array substrate 100 and the color filter substrate 200 and a sealant 350 for combining the array substrate 100 with the color filter substrate 200.

In addition, the display panel 300 includes a display area DA for displaying an image, a sealant area SA enclosing the displaying area DA, a first peripheral area PA1 outside the sealant area SA and a second peripheral area PA2 positioned between the display area DA and the sealant area SA.

The array substrate has a first substrate 110. First through n-th gate lines GL1 to GLn and first through m-th data lines DL1 to DLm are formed on the first substrate 110 in the display area DA, wherein each of m and n denotes a natural number. The gate lines GL1 to GLn extend in a first direction, and the data lines DL1 to DLm are insulated from the gate lines GL1 to GLn to extend in a second direction substantially perpendicular to the first direction.

A plurality of thin film transistors (TFTs) and a plurality of liquid crystal capacitors are formed on the first substrate 110 in the display area DA. For example, a first thin film transistor Tr1 among the thin film transistors has a control electrode electrically coupled to the first gate line GL1, a first current electrode coupled to the first data line DL1, and a second current electrode coupled a first liquid crystal capacitor CLC1.

A first organic film 130 is formed on the first thin film transistor Tr1 that is formed on the first substrate 110 in the display area DA. The first organic film 130 has a contact hole 135 through which a portion of the first thin film transistor Tr1 is exposed.

A pixel electrode 140, which is a transparent electrode, is formed on the first organic film 130. The pixel electrode 140 is electrically coupled to the first thin film transistor Tr1 via the contact hole 135. In addition, a reflective electrode 150 is formed on the pixel electrode 140 to reflect the light (e.g., natural light from the environment) that passes through a second substrate 210 of the color filter substrate 200.

The reflective electrode 150 has a transmitting window 155 to transmit the light coming from the bottom of FIG. 2 that passes through the first substrate 110 via the pixel electrode 140 positioned below the reflective electrode 150. The light that enters the display panel 300 through the first substrate 1 10 is usually light from an artificial light source that is incorporated into the display device.

The first peripheral area PA1 of the first substrate 110 of the array substrate 100 extends such that the first peripheral area PA1 of the first substrate 110 is longer than the first peripheral area PA1 of the second substrate 210 of the second color filter 200. The data driver 170 implemented as a chip is mounted on the peripheral area PA1 of the first substrate that extends beyond the second substrate 210. The data driver 170 is electrically coupled to the first through m-th data lines DL1 to DLm in the display area DA. Therefore, the first driving signal outputted from the data driver 170 is applied to the first through m-th data lines DL1 to DLm.

The gate driver 160 may be prepared using the same manufacturing process as the thin film transistor, and is formed in the sealant area SA that is adjacent to the second peripheral area PA2. The gate driver 160 is electrically coupled to the first through n-th data lines GL1 to GLn in the display area DA. Therefore, the second driving signal outputted from the gate driver 160 is applied to the first through n-th gate lines GL1 to GLn.

In addition, the sealant 350 for combining the array substrate 100 with the color filter substrate 200 is formed in the sealant area SA. The sealant 350 positioned between the array substrate 100 and the color filter 200 includes a photosetting material. Therefore, when the sealant 350 is exposed to light, the sealant 350 is cured (or hardened) to couple the array substrate 100 with the color filter substrate 200 (or to bind the array substrate 100 to the color filter substrate 200).

The sealant 350 covers the gate driver 160 formed in the sealant area SA. As explained above, the parasitic capacitance generated between a common electrode 220 of the color filter substrate 200 and the gate driver 160 is reduced by the presence of the sealant 350 between the color filter substrate 200 and the gate driver 160.

The liquid crystal layer 330 is positioned between the array substrate 100 and the color filter substrate 200 corresponding to the display area DA and the second peripheral area PA2. The liquid crystal layer 330 is formed on the color filter substrate 200 or the array substrate 100 by a liquid crystal dropping process before the array substrate 100 is sealed to the color filter substrate 200 by the sealant 350.

Therefore, the liquid crystal layer 330 is already positioned between the array substrate 100 and the color filter substrate 200 when the sealant 350 is cured by light.

The color filter substrate 200 includes the common electrode 220 formed on the entire surface of the second substrate 210 and a light blocking layer 230 formed in the sealant area SA and the first and second peripheral areas PA1 and PA2 adjacent to the sealant area SA. The color filter substrate 200 further includes a color filter layer 240 positioned between the second substrate 210 and the common electrode 220. The color filter layer 240 includes respective pixels for representing red, green and blue colors.

A second organic film 500 is formed on the gate driver 160. The second organic film 500 has a pattern to form a predetermined pattern taper angle θ. The second organic film 500 is formed in the sealant area SA and a portion of the first and second peripheral areas PA1 and PA2. The second organic film 500 is formed by the same manufacturing process as the first organic film 130.

The predetermined taper angle θ may be about zero to about fifty degrees. The second organic film 500 may have the taper angle θ of about zero to about fifty degrees near the boundaries between the opening and the closed segment of the mask, wherein the mask is used to pattern an organic material layer deposited to form the second organic film 500. In addition, a mask patterned with a slit is used to adjust an exposure of the second organic film 500 so that the second organic film 500 has the taper angle θ less than or equal to about fifty degrees.

A first reflective film 510 as a reflective member is formed on the second organic film 500 and the first substrate 110 corresponding to the first peripheral area PA1. A second reflective film 520 as the reflective member is formed on the second organic film 500 and the first substrate 110 corresponding to the second peripheral area PA2. The first and second reflective films 510 and 520 are formed by the same process of manufacturing the reflective electrode 150 so as to have the same material as the reflective electrode 150. The first and second reflective films 510 and 520 are inclined at as the taper angle θ of the second organic film 500 with respect to the first substrate 110. Namely, the first and second reflective films 510 and 520 may have an incline angle of about zero to about fifty degrees.

The first and second reflective films 510 and 520 reflect light that is provided from a rear of the first substrate 110 to cure (or harden) the sealant 350 so that the light may be provided to the sealant 350 formed above the gate driver 160. The "rear" corresponds to the bottom of FIG. 2. The light may be an ultraviolet light (UV).

Figure 3:
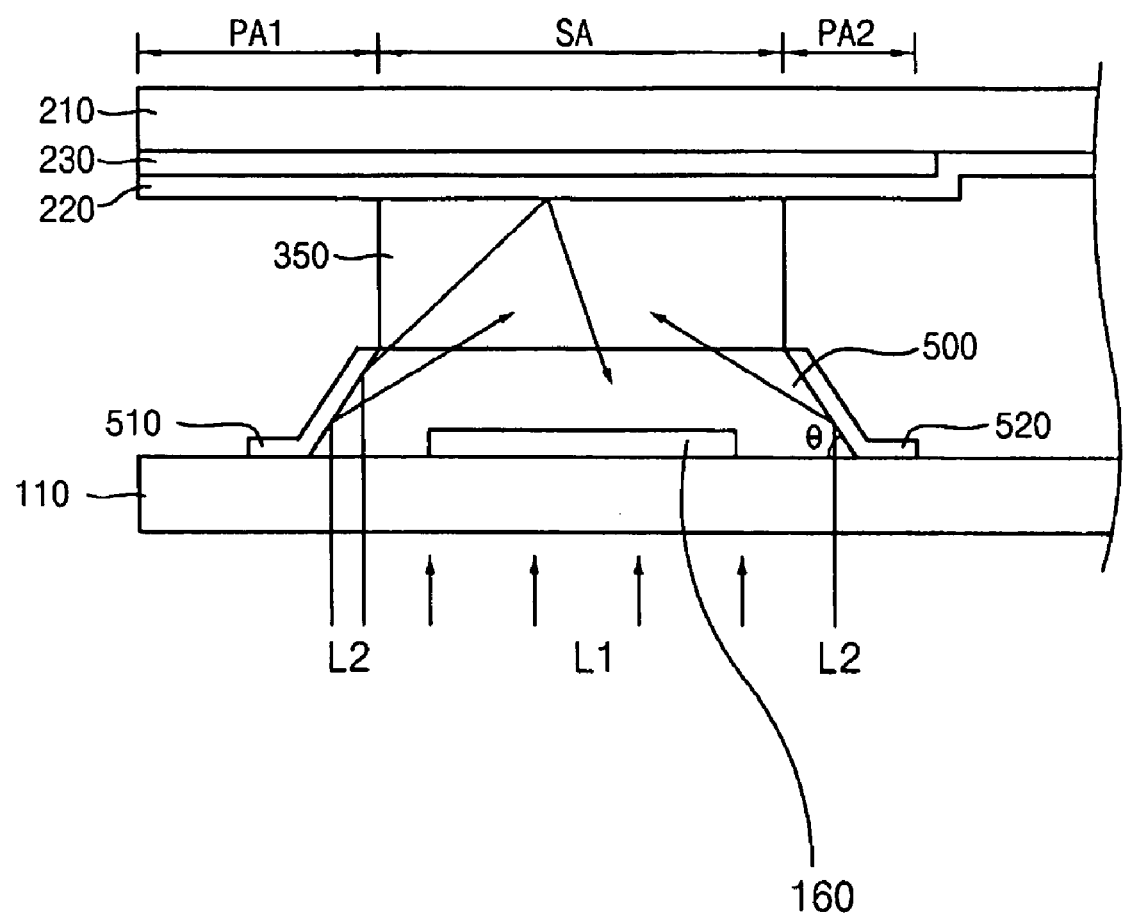
FIG. 3 is a cross sectional view illustrating a reflection of an ultraviolet light by using first and second reflective films in FIG. 2.

FIG. 3 is a cross sectional view illustrating a reflection of the ultraviolet light by using the first and second reflective films 510 and 520 in FIG. 2.

Referring to FIG. 3, the second organic film 500 is formed on an upper portion of the gate driver 160 having a pattern to form a predetermined taper angle θ. In addition, the first reflective film 510 is formed on the second organic film 500 and the first substrate 110 in the first peripheral area PA1. The second reflective film 520 is formed on the second organic film 500 and the first substrate 110 in the second peripheral area PA2. The first and second reflective films 510 and 520 also make the predetermined taper angle θ with respect to the first substrate 110.

Additionally, the sealant 350 is formed on the second organic film 500 to have a width wider than the width of the gate driver 160.

The ultraviolet light (UV) is provided from a rear of the first substrate 110 to cure the sealant 350. A first light L1 incident on a low portion of the gate driver 160 is blocked by the gate driver 160 and does not reach the sealant 350. On the other hand, the second light L2 incident on the first and second peripheral areas PA1 and PA2 is reflected by the first and second reflective films 510 and 520, and reaches the sealant 350 as shown by the arrows. Namely, the first and second reflective films 510 and 520 change the path of the second light L2 so that more light can reach the sealant 350.

Therefore, even though a portion of the ultraviolet light (UV) is intercepted by the gate driver 160, the rest of the ultraviolet light may reach the sealant 350 to serve the sealant-curing function. This way, the seal between the array substrate 100 and the color filter substrate 200 is improved.

Figure 4:
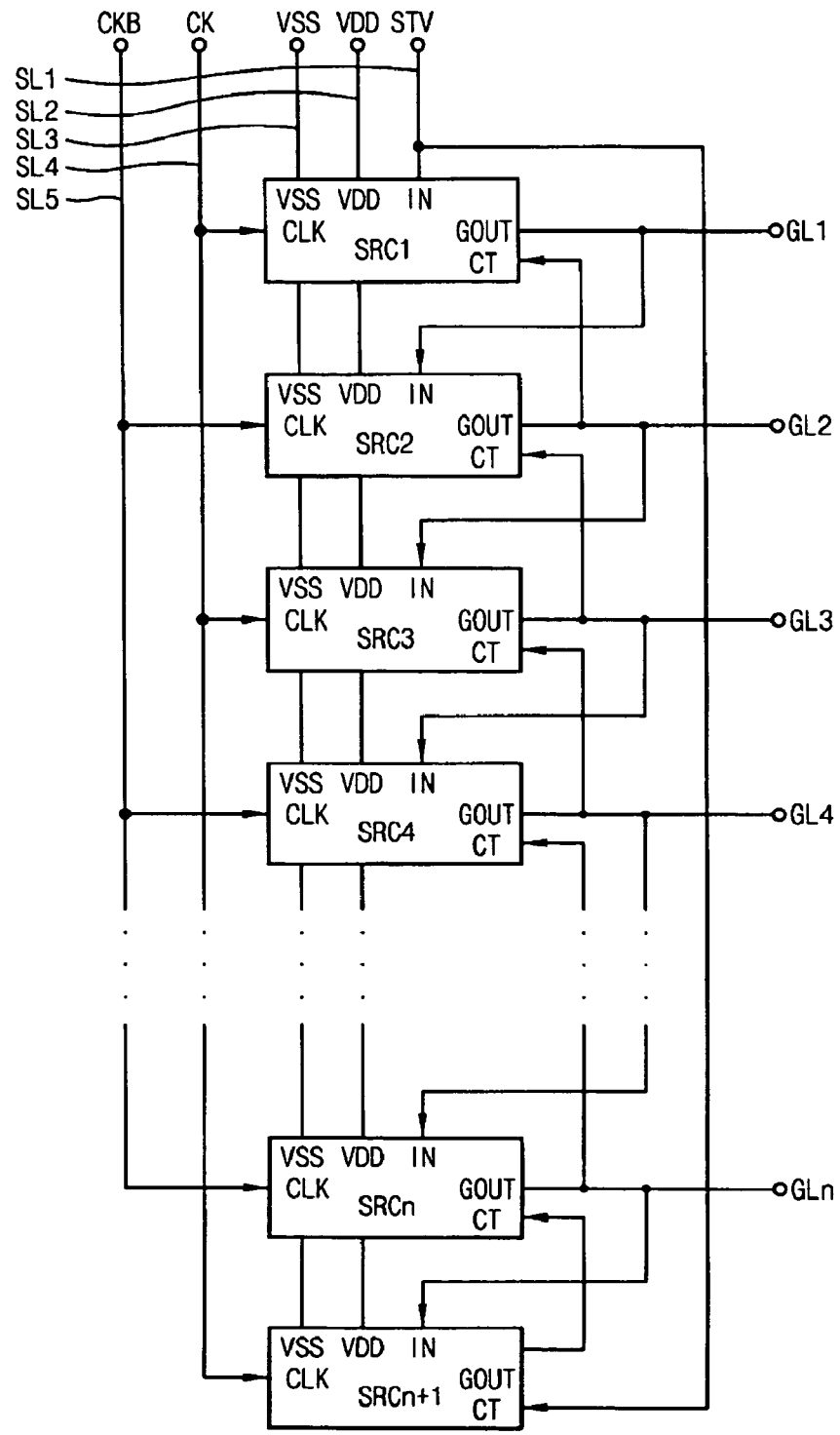
FIG. 4 is a block diagram illustrating a gate driver in FIG. 1.

FIG. 4 is a block diagram illustrating the gate driver 160 in FIG. 1.

Referring to FIG. 4, the gate driver 160 includes multiple stages SRC1 to SRCn+1 for sequentially outputting a gate signal. For example, n is an even number. Each of the multiple stages SRC1 to SRCn+1 has an input terminal IN, a clock terminal CLK, a control terminal CT and an output terminal GOUT. The clock terminal CLK receives one of a first clock CK and a second clock CKB. For example, the first clock CK is provided to the clock terminal CLK of odd-numbered stages SRC1, SRC3, . . . , SRCn+1 and the second clock CKB is provided to the clock terminal CLK of even-numbered stages SRC2, SRC4, . . . , SRCn.

The odd-numbered stages SRC1, SRC3, . . . , SRCn+1 output the first clock CK as a first gate drive signal through the output terminal GOUT and the even-numbered stages SRC2, SRC4, . . . , SRCn output the second clock CKB as the first gate drive signal through the output terminal GOUT.

Each of the output terminal GOUT of the multiple stages SRC1 to SRCn is connected to n gate lines GL1, GL2, . . . , GLn in the display area DA in one-to-one correspondence. The stage SRCn+1 is a dummy stage that is in a floating state. The first gate drive signals outputted from the respective output terminals GOUT of the multiple stages SRC1 to RCn are sequentially applied to first through n-th gate lines GL1, GL2, . . . , GLn.

The input terminal IN is coupled to the output terminal GOUT of a preceding stage to receive the first gate drive signal outputted from the preceding stage. The control terminal CT is coupled to the output terminal GOUT of a next stage to receive the first gate drive signal outputted from the next stage.

A start signal STV is applied to the input terminal IN of the first stage SRC1 and also to the control terminal CT of the dummy stage SRCn+1.

In addition, each of the multiple stages SRC1 to SRCn+1 further includes a ground voltage terminal VSS to which a ground voltage is provided and a driving voltage terminal VDD to which a driving voltage is provided.

Thus, the gate driver 160 sequentially outputs the gate signal to the first through n-th gate lines GL1 through GLn.

Additionally, the gate driver 160 is provided with a start signal line SL1, a supply voltage line SL2, a ground voltage line SL3, a first clock line SL4 and a second clock line SL5 that extend substantially parallel to one another.

The start signal line SL1 provides the start signal STV provided from an exterior to the input terminal IN of the first stage SRC and the control terminal CT of the dummy stage SRCn+1. The first clock line SL4 provides the first clock CK to the clock terminal CLK of the odd numbered stages SRC1, SRC3, . . . , SRCn+1. The second clock line SL5 provides the second clock SKB to the clock terminal CLK of the even numbered stages SRC2, SRC4, . . . , SRCn. The supply voltage line SL2 provides a supply voltage VDD to the respective stages SRC1 to SRCn+1.

Figure 5:
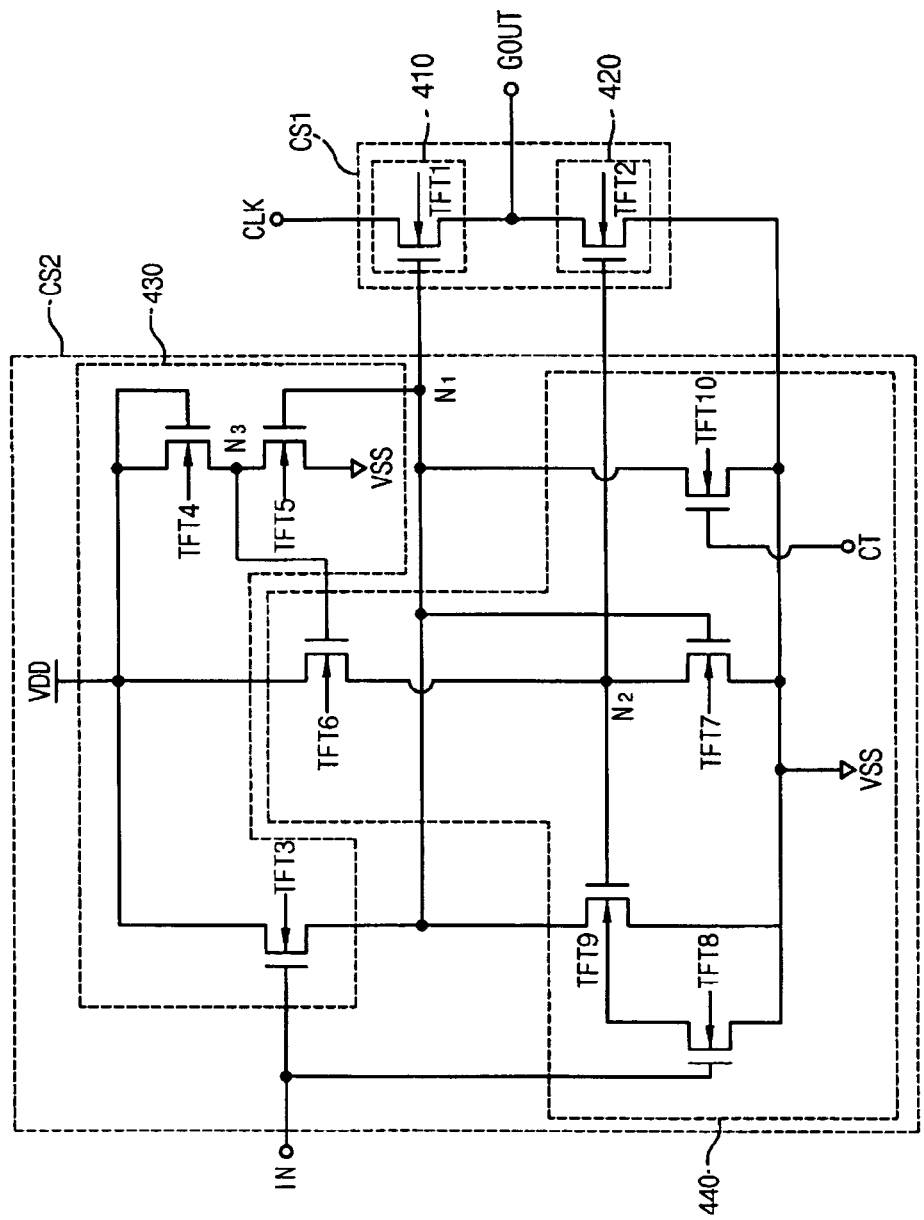
FIG. 5 is an equivalent circuit diagram illustrating a stage of the gate driver in FIG. 4.

FIG. 5 is an equivalent circuit diagram illustrating a stage of the gate driver 160 in FIG. 4.

Referring to FIG. 5, each stage of the gate driver 160 includes a first circuit unit CS1 coupled to one of the first through n-th gate lines GL1 to GLn to output the first gate drive signal and a second circuit unit CS2 for driving the first circuit unit CS1.

The first circuit unit CS1 includes a pull-up section 410 and a pull-down section 420. Additionally, the second circuit unit CS2 includes a pull-up driver 430 and a pull-down driver 440.

The pull-up driver 410 includes a first transistor TFT1 having a gate electrode coupled to a first node N1, a source electrode coupled to the clock terminal CLK and a drain electrode coupled to the output terminal GOUT. The pull-down section 420 includes a second transistor TFT2 having a gate electrode coupled to a second node N2, a drain electrode coupled to the output terminal GOUT and a source electrode coupled to the ground voltage terminal VSS.

The pull-up driver 430 includes third, fourth and fifth transistors TFT3, TFT4 and TFT5 to turn on the pull-up section 410.

The third transistor TFT3 has a gate electrode coupled to the input terminal IN, a drain electrode coupled to the driving voltage terminal VDD and a source electrode coupled to the first node N1. The fourth transistor TFT4 has gate and drain electrodes coupled to the driving voltage terminal VDD and a source electrode coupled to a third node N3. The fifth transistor TFT5 has a gate electrode coupled to the first node N1, a drain electrode coupled to the third node N3 and a source electrode coupled to the ground voltage terminal VSS.

The pull-down driver 440 includes sixth, seventh, eighth, ninth and tenth transistors TFT6, TFT7, TFT8, TFT9 and TFT10 to turn off the pull-up section 410 and to turn on the pull-down section 440.

The sixth transistor TFT6 has a gate electrode coupled to the third node N3, a drain electrode coupled to the driving voltage terminal VDD and a source electrode coupled to the second node N2. The seventh transistor TFT7 has a gate electrode coupled to the first node N1, a drain electrode coupled to the second node N2 and a source electrode coupled to the ground voltage terminal VSS. The eighth transistor TFT8 has a gate electrode coupled to the input terminal IN, a drain electrode coupled to the second node N2 and a source electrode coupled to the ground voltage terminal VSS.

The ninth transistor TFT9 has a gate electrode coupled to the second node N2, a drain electrode coupled to the first node N1 and a source electrode coupled to the ground voltage terminal VSS. The tenth transistor TFT10 has a gate electrode coupled to the control terminal CT, a drain electrode coupled to the first node N1 and a source electrode coupled to the ground voltage terminal VSS.

The first and second transistors TFT1 and TFT2 of the first circuit unit CS1 have a transistor size relatively larger than those of the third through tenth transistors TFT3 to TFT10. Therefore, the first and second transistors TFT1 and TFT2 take up more area than those of the third through tenth transistors TFT3 to TFT10. The "transistor size" is a ratio W/L wherein W is the channel width of the transistor and L is its channel length. The first and second transistors TFT1 and TFT2 are not adjacent to each other but spaced apart from each other by a predetermined distance.

Figure 6:
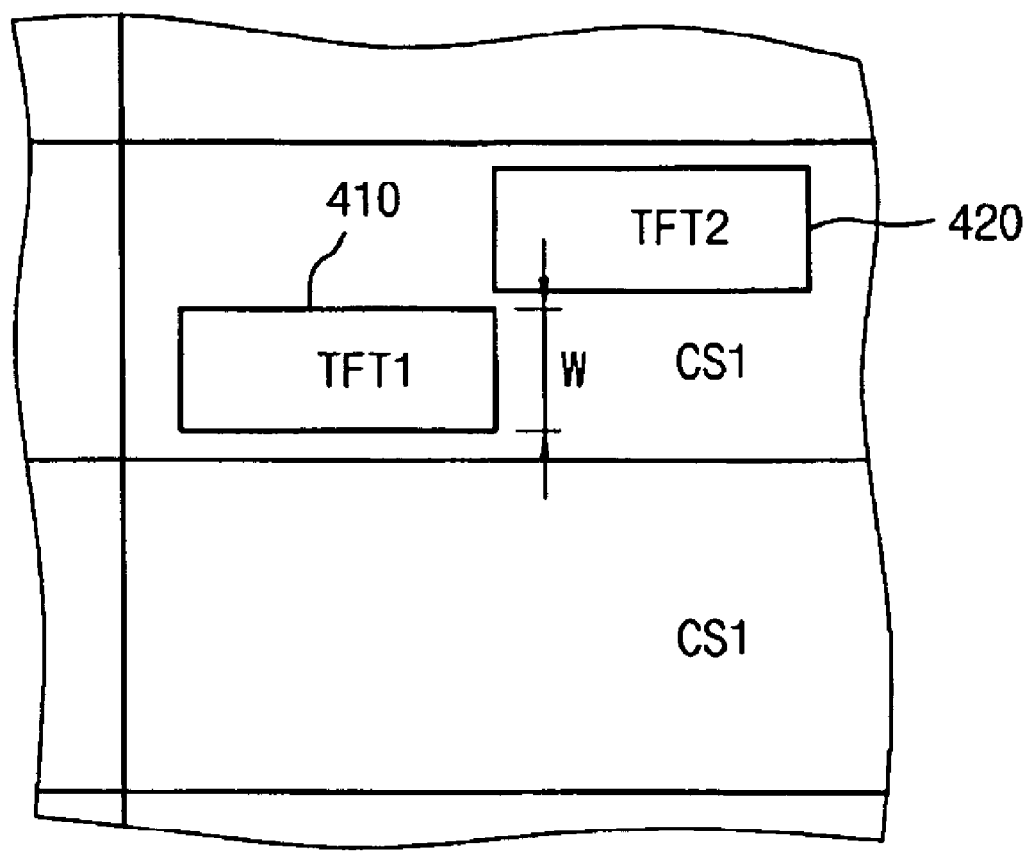
FIG. 6 is a schematic view illustrating a first circuit unit in FIG. 5.

FIG. 6 is a schematic view illustrating the first circuit unit CS1 in FIG. 5.

Referring to FIG. 6, the first circuit unit CS1 includes the first transistor TFT1 positioned in a left lower portion of an area where the first circuit unit CS1 is formed and the second transistor TFT2 positioned in a right upper portion.

The transistors TFT3 through TFT10 of the second circuit unit CS2 having a relatively small transistor size are formed outside the first and second transistors TFT1 and TFT2.

The first and second transistors 410 and 420 are spaced apart from each other so that more light passes through the gate driver 160 to reach the sealant 350. Therefore, the sealant 350 is cured enough to firmly couple the array substrate 100 to the color filter substrate 200.

Figure 7A:
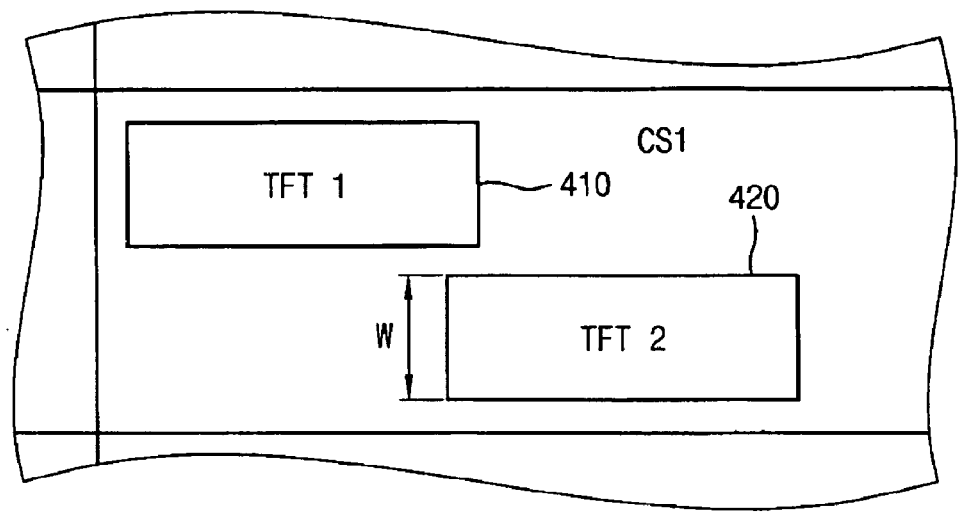
FIGS. 7A through 7C are plan views illustrating other various embodiments of the first circuit unit in FIG. 5.
Figure 7B:
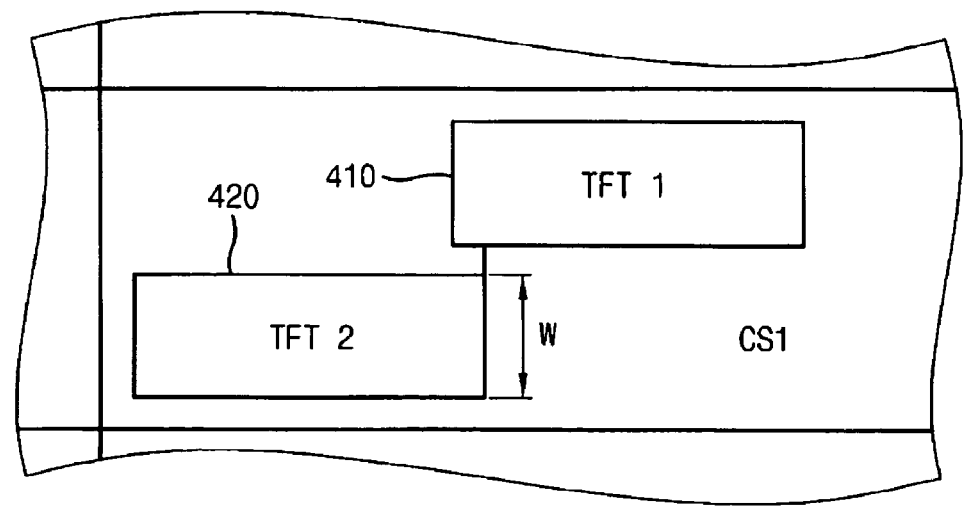
Figure 7C:
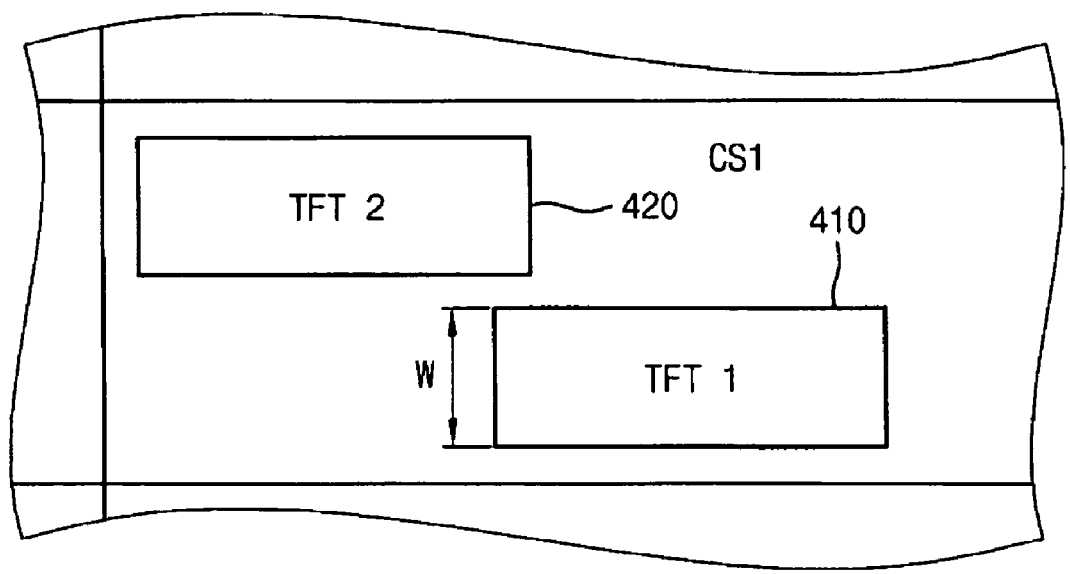

FIGS. 7A through 7C are plan views illustrating other various embodiments of the first circuit unit CS1 in FIG. 5.

Referring to FIG. 7A, the first transistor (TFT1) 410 of the first circuit unit CS1 is positioned in a left upper portion of the area where the first circuit unit CS1 is formed and the second transistor (TFT2) 420 is positioned in a right lower portion.

Referring to FIG. 7B, the first transistor (TFT1) 410 of the first circuit unit CS1 is positioned in a right upper portion of the area where the first circuit unit CS1 is formed and the second transistor (TFT2) 420 is positioned in a left lower portion.

Referring to FIG. 7C, the first transistor (TFT1) 410 of the first circuit unit CS1 is positioned in a right lower portion of the area where the first circuit unit CS1 is formed and the second transistor (TFT2) 420 is positioned in a left upper portion.

As illustrated in FIGS. 6, 7A, 7B, and 7C, the first and second transistors TFT1 and TFT2 of the first circuit unit CS1 may be disposed in various ways such that the first and second transistors TFT1 and TFT2 are spaced apart from each other.

Figure 8A:
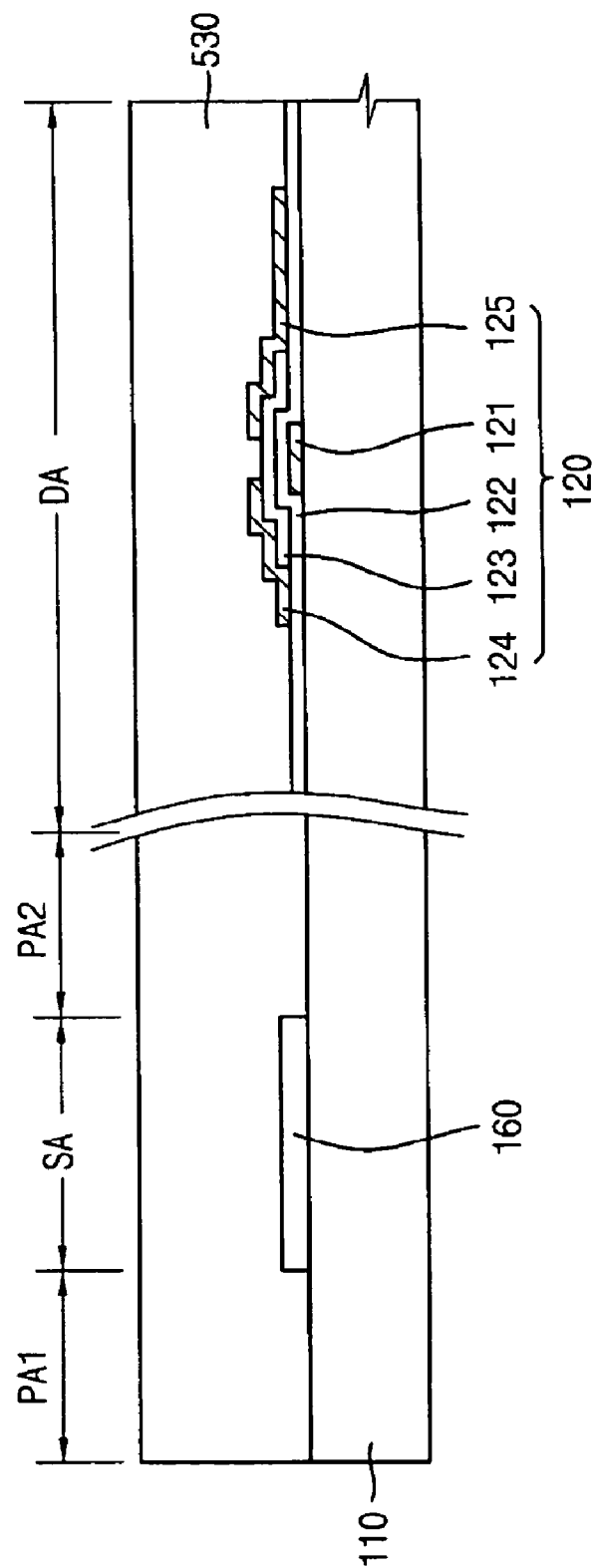
FIGS. 8A through 8C are cross sectional views illustrating a manufacturing process of an array substrate in FIG. 2.
Figure 8B:
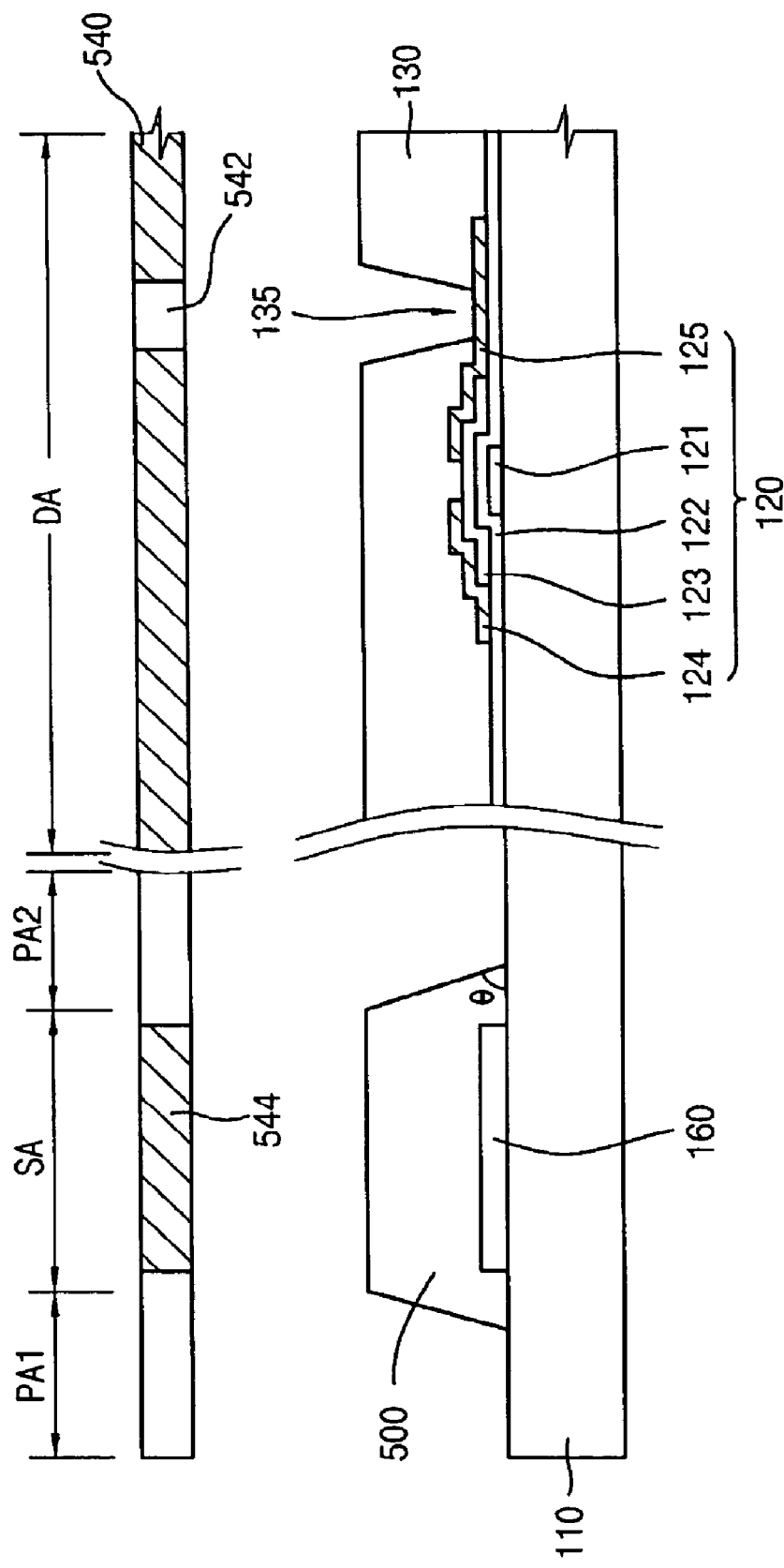
Figure 8C:
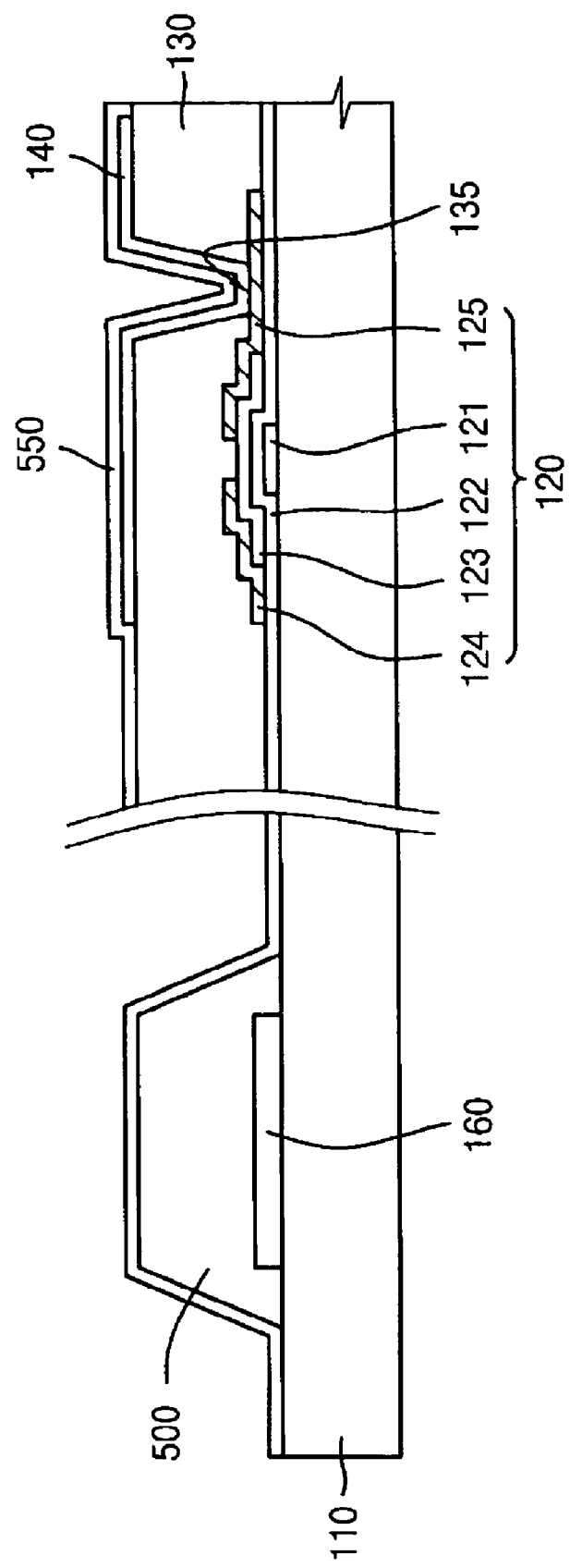

FIGS. 8A through 8C are cross sectional views illustrating a manufacturing process of the array substrate 100 in FIG. 2.

As shown in FIG. 8A, a thin film transistor 120 having a gate electrode 121, a source electrode 124 and a drain electrode 125 is formed on the first substrate 110 in the display area DA. In addition, a gate driver 160 is formed in the sealant area SA of the first substrate 110. The gate driver 160 includes a plurality of transistors and wirings. A reference numeral 122 represents a gate insulation layer, and a reference numeral 123 represents an active layer.

Subsequently, an entire surface of the first substrate 110 on which the thin film transistor 120 and the gate driver 160 are formed is coated with a photoresist insulation layer 530 such as an acrylic resin.

Referring to FIG. 8B, a mask 540 having a predetermined pattern is formed on the photoresist insulation layer 530. The mask 540 has an opening 542 for exposing a portion of the drain electrode 125 of the thin film transistor 120. Additionally, the mask 540 has a closed segment 544 that prevents a removal of the photoresist insulation layer 530 formed in the sealant area SA and the first and second peripheral areas PA1 and PA2.

When the photoresist insulation layer 530 is exposed by the mask 540, the photoresist insulation layer 530 is developed by tetramethyl ammonium hydroxide (TMAH). A first organic film 130 having a contact hole 135 is formed in an area exposed by the opening 542. In addition, a second organic film 500 is formed in the sealant area SA and the first and second peripheral areas PA1 and PA2 that are adjacent to the sealant area SA. The second organic film 500 has a pattern to form a predetermined taper angle θ. For example, the predetermined taper angle θ is between about zero to fifty degrees.

Referring to FIG. 8C, a transparent conductive film such as ITO or IZO having a substantially uniform thickness is formed on the first organic film 130 to form a pixel electrode 140. The pixel electrode 140 is electrically coupled to the drain electrode 125 of the thin film transistor 120 via the contact hole 135.

A metal layer having a relative high reflectivity such as aluminum is deposited with a substantially uniform thickness on an entire surface of the first substrate 110 where the pixel electrode 140 is formed. The reflective metal layer forms the reflective electrode layer 550.

In the same way as in FIG. 2, the reflective electrode layer 550 is patterned to form the reflective electrode 150 having a transmitting window 155 in the display area DA and the first and second reflective films 510 and 520 in the first and second peripheral areas PA1 and PA2.

As described above, according to the exemplary embodiment of the present invention, the reflective film having a predetermined angle is formed in the first and second peripheral areas PA1 and PA2 that are adjacent to the sealant area SA where the gate driver is formed so that the ultraviolet light (UV) provided from the rear of the array substrate is reflected by the reflective film to reach the sealant formed above the gate driver. Therefore, the sealant is cured by the ultraviolet light to firmly combine the array substrate with the color filter substrate.

Figure 9:
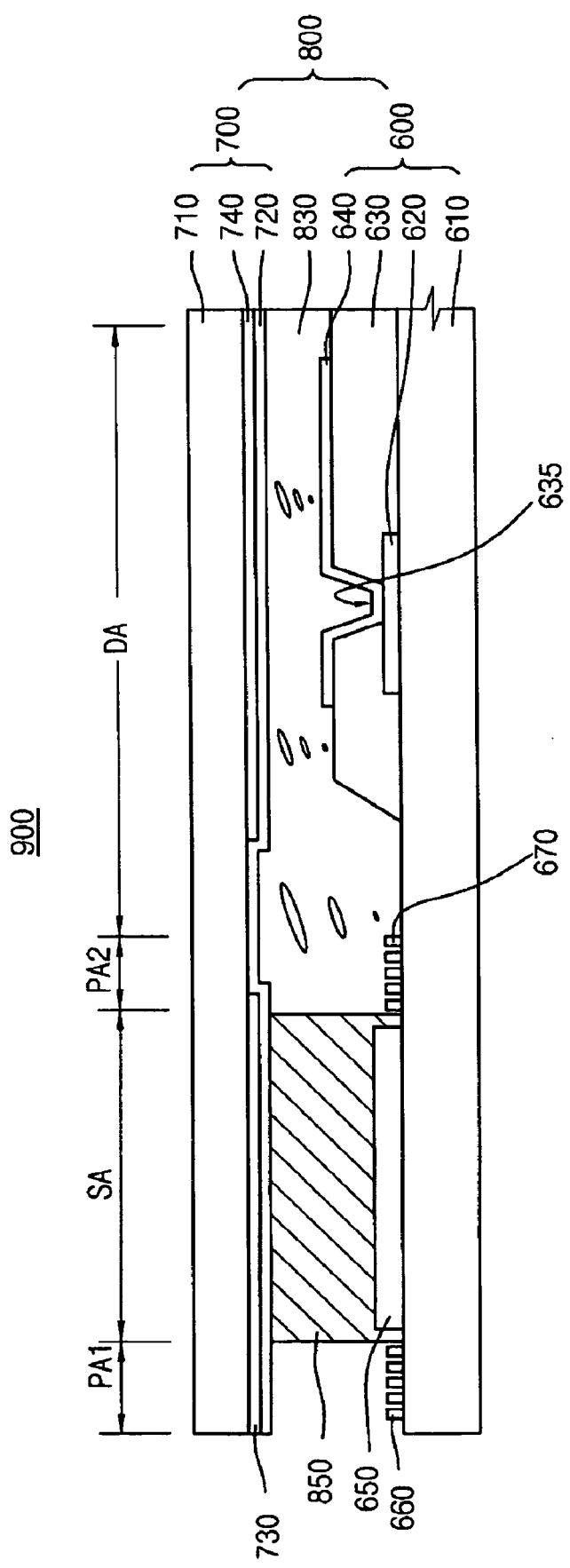
FIG. 9 is a cross sectional view illustrating a display device according to another exemplary embodiment of the present invention.

FIG. 9 is a cross sectional view illustrating a display device according to another exemplary embodiment of the present invention.

Referring to FIG. 9, the display device 900 includes a display panel 800 for displaying an image in response to first and second driving signals and a gate driver 650 included in the display panel 800 to output the first driving signal to the display panel 800. The display device 900 further includes a data driver (not shown) included in the display panel 800 to output the second driving signal to the display panel 800.

The display panel 800 includes a display area DA for displaying an image, a sealant area SA, a first peripheral area PA1 positioned outside the sealant area SA and a second peripheral area PA2 disposed between the display area DA and the sealant area SA.

A plurality of gate lines (not shown) and a plurality of data lines (not shown) are formed on a first substrate 610 of the array substrate 600 corresponding to the display area DA. The gate lines and the data lines are electrically insulated from each other and extend in substantially perpendicular directions.

In addition, a plurality of thin film transistors 620 are formed in the display area DA on the first substrate 610. Each of the thin film transistor 620 includes a gate electrode (not shown), a source electrode (not shown) and a drain electrode (not shown). The gate electrode is coupled to the gate lines and the source electrode is coupled to the data lines.

An organic film 630 is formed over the thin film transistors 620. The organic film 630 has a contact hole 635 through which a portion of the drain electrode is exposed. A pixel electrode 640 is formed on the organic film 630. The pixel electrode 640 is electrically coupled to the drain electrode of the thin film transistor 620 via the contact hole 635.

A gate driver 650 is embodied using the same process of manufacturing the thin film transistor 620. The gate driver 650 is formed to correspond to the sealant area SA. The gate driver 650 is electrically coupled to the gate lines formed in the display area DA. Therefore, the second driving signal outputted from the gate driver 650 is provided to the gate lines.

A sealant 850 is formed in the sealant area SA to combine the array substrate 600 with the color filter substrate 700. The sealant 850 positioned between the array substrate 600 and the color filter substrate 700 includes a photosetting material. Therefore, when light is shined onto the sealant 850, the sealant 850 is cured to securely couple the array substrate 600 to the color filter substrate 700. The sealant 850 covers the gate driver 650 formed in the sealant area SA.

The color filter substrate 700 includes a common electrode 720 formed on the entire surface of the second substrate 710 and a light blocking layer 730 corresponding to the sealant SA and the first and second peripheral areas PA1 and PA2.

A liquid crystal layer 830 is disposed between the color filter substrate 700 and the array substrate 600 corresponding to the display area DA and the second peripheral area PA2. The liquid crystal layer 830 is formed by the liquid crystal dropping process.

A first reflective pattern 660 and a second reflective pattern 670 are formed in the first and second peripheral areas PA1 and PA2 that are adjacent to the sealant area SA where the gate driver 650 is formed.

The first and second reflective patterns 660 and 670 are formed using the same manufacturing process as for the gate electrode, source electrode and drain electrode. That is, a metal layer is deposited in the first and second peripherals PA1 and PA2 to form the gate electrode, source electrode or drain electrode and patterned to form the first and second reflective patterns 660 and 670. The first and second reflective patterns 660 and 670 include a plurality of sub patterns spaced apart from one another by a predetermined distance, respectively. The sub patterns of the first and second reflective patterns 660 and 670 may have an island pattern in which the sub patterns are spaced apart from one another.

A light provided from a rear of the first substrate 610 is reflected by the first and second reflective patterns 660 and 670 to reach the sealant 850 positioned above the gate driver 650 to cure the sealant 850. The light may be an ultraviolet light (UV). The "rear" of the first substrate 610 corresponds to the bottom of FIG. 9.

Figure 10:
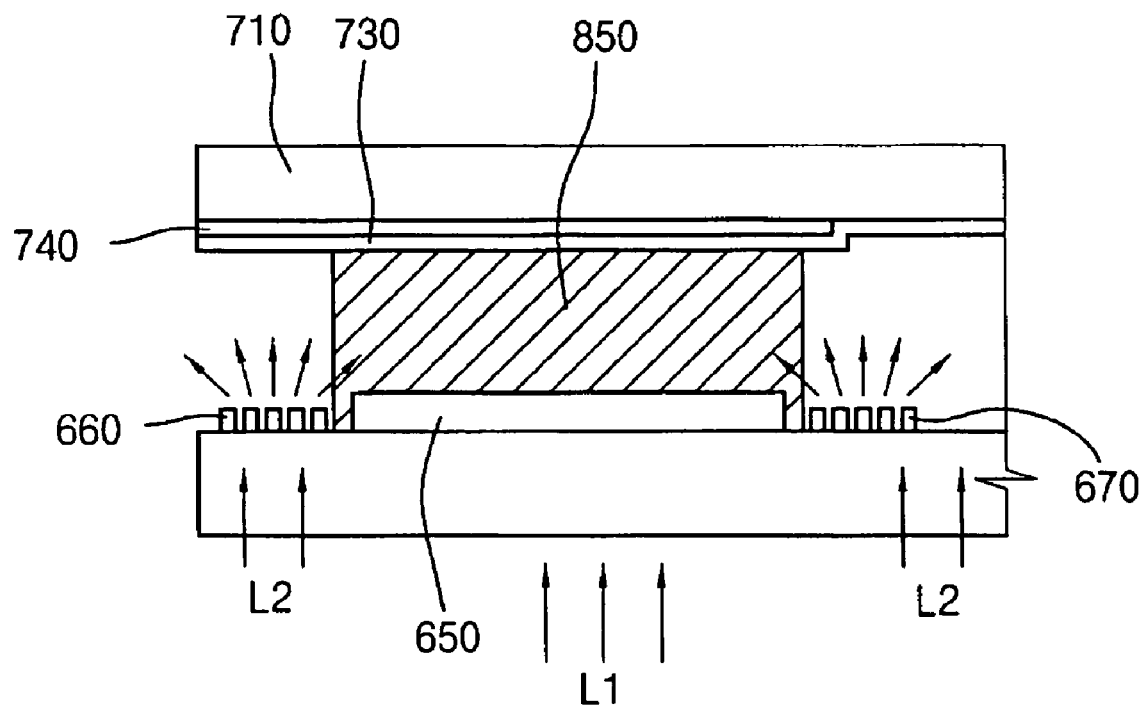
FIG. 10 is a cross sectional view illustrating a reflection of an ultraviolet light by using first and second reflective patterns in FIG. 9.

FIG. 10 is a cross sectional view illustrating a reflection of the ultraviolet light by using the first and second reflective patterns 660 and 670 in FIG. 9.

Referring to FIG. 10, the first and second reflective patterns 660 and 670 having the plurality of sub patterns spaced apart from one another is formed in the first and second peripheral areas PA1 and PA2 adjacent to the sealant area SA where the gate driver 650 is formed. In addition, the sealant 850 is formed on an upper portion of the gate driver 650 to have a width wider than the width of the gate driver 650.

An ultraviolet light (UV) is provided from a rear of the first substrate 610 to cure the sealant 850. A first light L1 that is the ultraviolet light (UV) incident on a rear of the gate driver 650 is intercepted by the gate driver 650 so that the first light L1 does not reach the sealant 850. A second light L2 that is the ultraviolet light (UV) incident on the first and second peripheral areas PA1 and PA2 is scattered by the first and second reflective patterns 660 and 670 to reach the sealant 850.

Particularly, the second light L2 passes through a gap between the sub patterns of the first and second reflective patterns 660 and 670 or the second light L2 is scattered by the sub patterns of the first and second reflective patterns 660 and 670. Therefore, the second light L2 may reach the sealant 850 formed above the gate driver 650.

Thus, even though a portion of the ultraviolet light (UV) is intercepted by the gate driver 650, the rest of the ultraviolet light may reach the sealant 850 and contribute to the curing of the sealant 850. The extra light that reaches the sealant 850 improves the seal between the array substrate 600 and the color filter 700.

Figure 11:
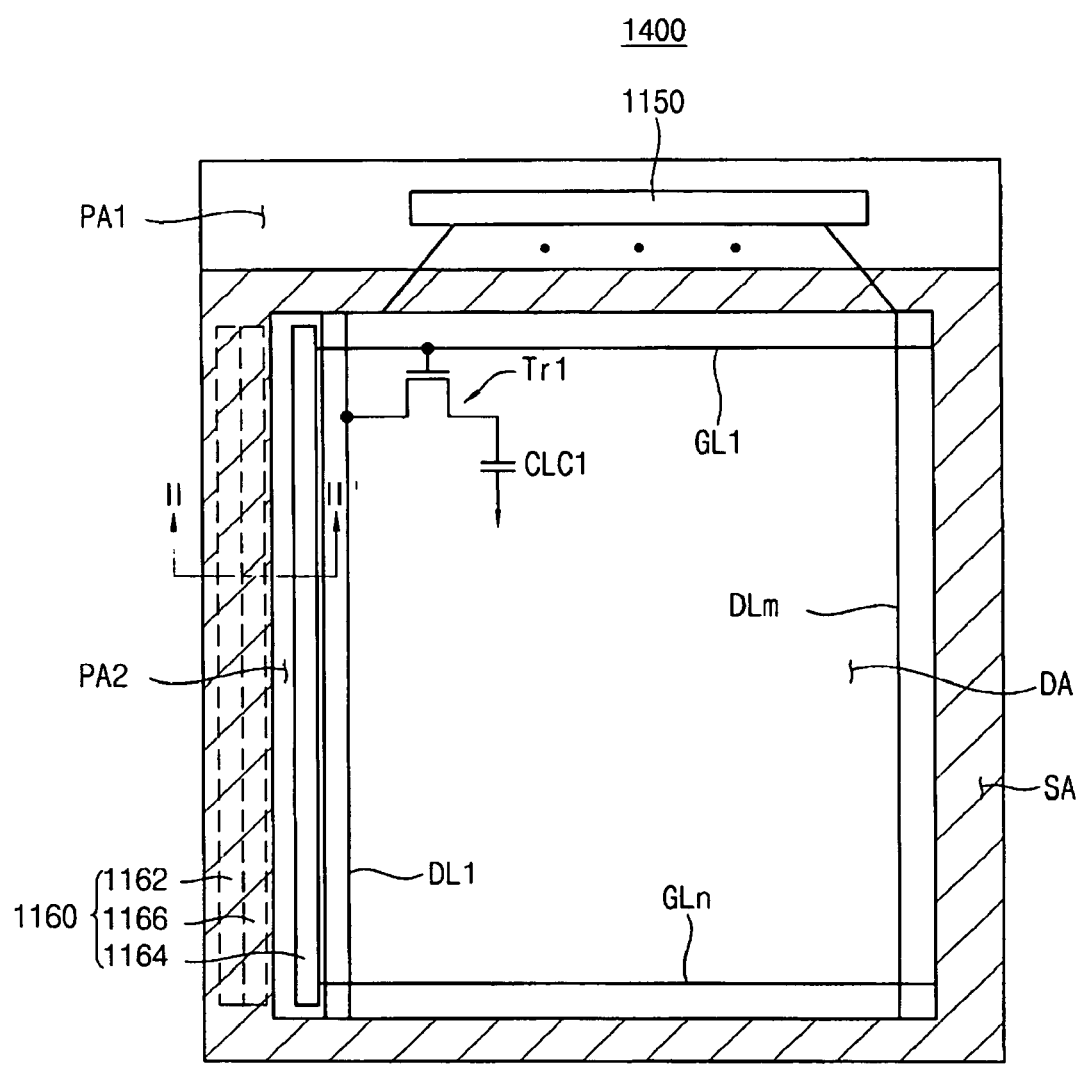
FIG. 11 is a cross sectional view illustrating a display device according to yet another exemplary embodiment of the present invention.
Figure 12:
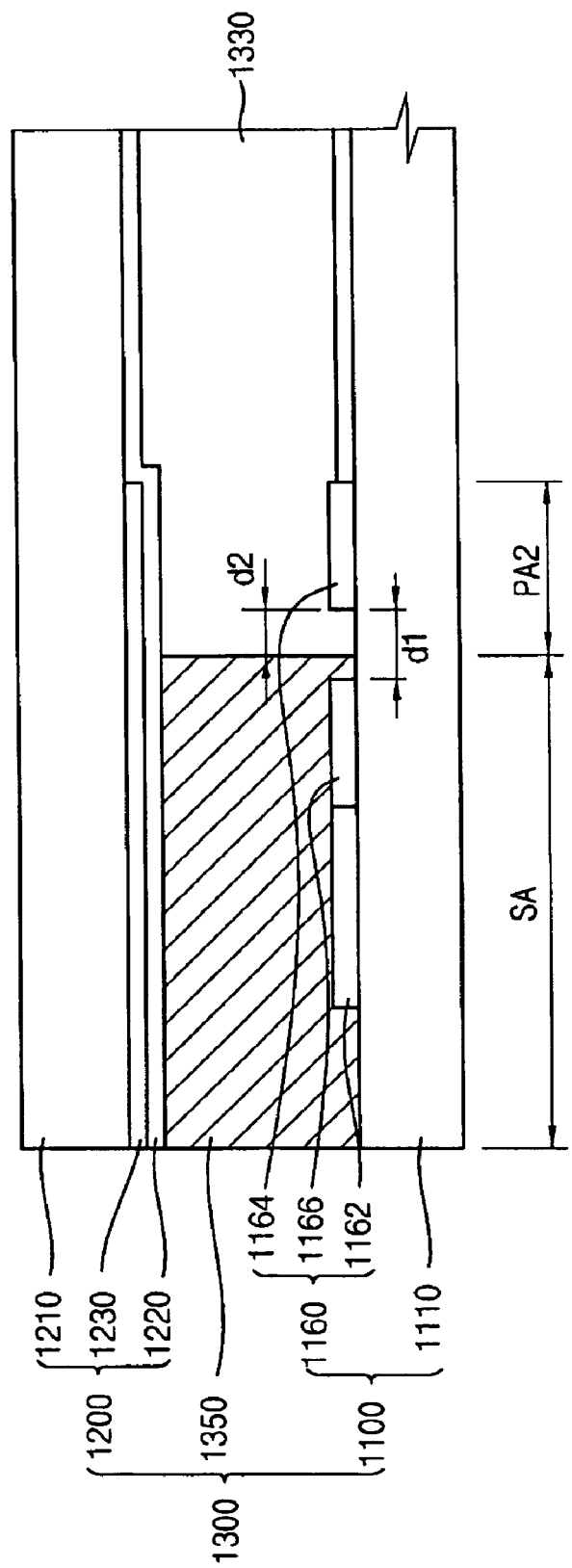
FIG. 12 is a cross sectional view taken along a line II-II' in FIG. 11.
Figure 13:
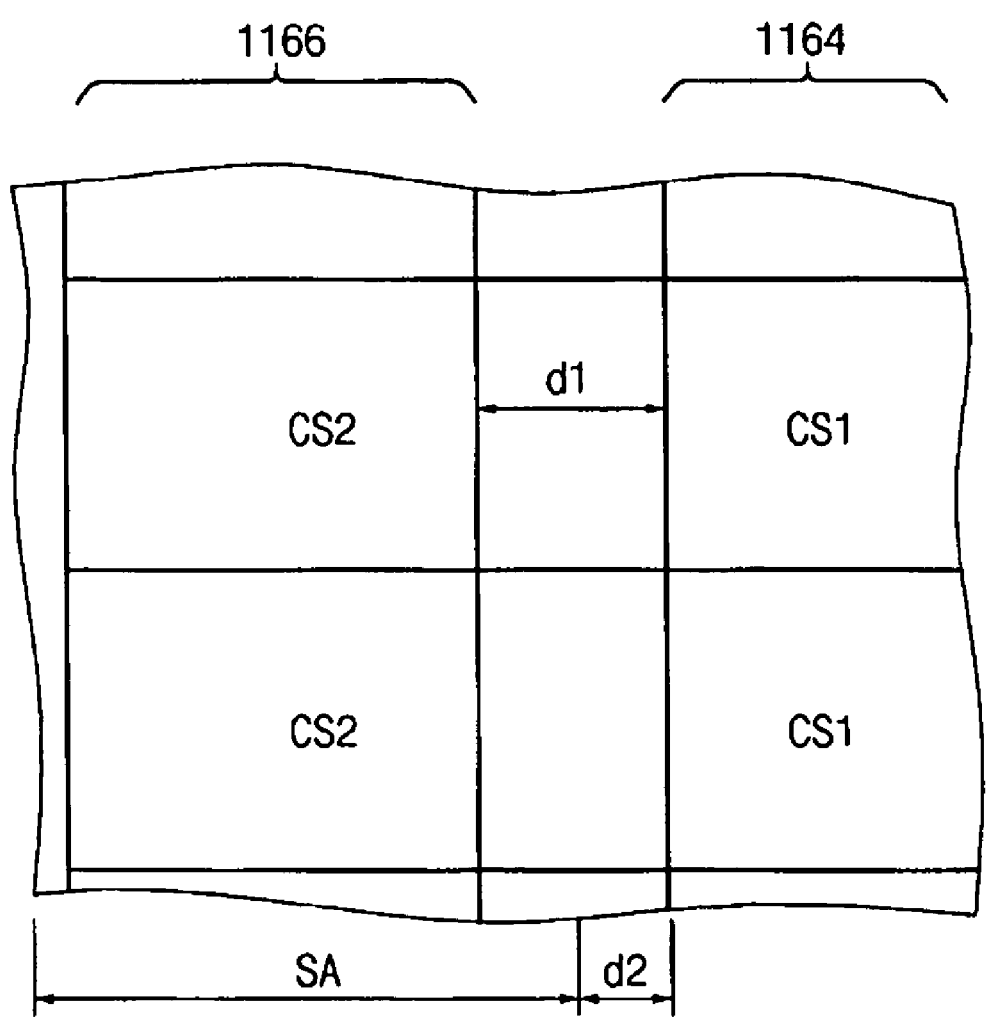
FIG. 13 is a detailed view illustrating a part of a gate driver in FIG. 12.

FIG. 11 is a cross sectional view illustrating a display device according to yet another exemplary embodiment of the present invention, FIG. 12 is a cross sectional view taken along a line II-II' in FIG. 11 and FIG. 13 is a detailed view illustrating a part of a gate driver in FIG. 12.

Referring to FIGS. 11 through 13, the display device 1400 according to yet another exemplary embodiment of the present invention includes a display panel 1300 for displaying an image in response to first and second driving signals and a data driver 1150 and a gate driver 1160 to output the first and second driving signals to the display panel 1300, respectively. The display panel 1300 includes the data driver 1150 and the gate driver 1160. The display panel 1300 also includes an array substrate 1100, a color filter substrate 1200 positioned substantially parallel to the array substrate 1100, and a sealant 1350 that holds the array substrate 1100 and the color filter substrate 1200 together.

The display panel 1300 includes a display area DA for displaying an image, a sealant area SA enclosing the displaying area DA, a first peripheral area PA1 positioned outside the sealant area SA and a second peripheral area PA2 disposed between the display area DA and the sealant area SA.

A plurality of gate lines GL1, . . . , GLn, a plurality of data lines DL1, . . . , DLm, a plurality of thin film transistors and a plurality of liquid crystal capacitors are formed on a first substrate 1110 of the array substrate 1100 corresponding to the display area DA. For example, a first thin film transistor Tr1 of the thin film transistors has a gate electrode electrically coupled to a first gate line GL1, a source electrode electrically coupled to a first data line DL1 and a drain electrode electrically coupled to a first liquid crystal capacitor CLC1 of the liquid crystal capacitors.

The data driver 1150 is implemented as a chip is mounted on the first substrate 1110 in the first peripheral area PA1. The data driver 1150 is electrically coupled to the data lines DL1, . . . , DLm. Therefore, the first driving signal outputted from the data driver 1150 is provided to the data lines DL1, . . . , DLm.

The gate driver 1160, which is prepared using the same manufacturing process as for the thin film transistor, is formed in the sealant area SA and the second peripheral area PA2. The gate driver 1160 is electrically coupled to the gate lines GL1, . . . , GLn. Therefore, the second driving signal outputted from the gate driver 1160 is provided to the gate lines GL1, . . . , GLn.

The color filter substrate 1200 includes a second substrate 1210, a common electrode 1220 formed on an entire surface of the second substrate 1210 and a light blocking layer 1230 formed on the sealant area SA and the first and second peripheral areas PA1 and PA2 adjacent to the sealant area SA. The color filter substrate 1200 may further include a color filter layer (not shown) disposed between the second substrate 1210 and the common electrode 1220.

The gate driver 1160 includes an interconnection unit 1162, a first circuit unit 1164 and a second circuit unit 1166. The first circuit unit 1164 is directly coupled to the gate lines GL1 through GLn to output the second driving signal to the gate lines GL1 through GLn, and the second circuit unit 1166 drives the first circuit unit 1164. The gate driver 1160 has a configuration similar to the elements described in FIG. 4 and thus the description of the gate driver 1160 will be omitted.

Similar to FIG. 5, the first and second circuit units 1164 and 1166 have a plurality of transistors. The first circuit unit 1164 includes first and second transistors TFT1 and TFT2 and the second circuit unit 1166 includes third through tenth transistors TFT3~TFT10.

The first and second circuit sections 1164 and 1166 are spaced apart from each other by a first distance d1. The first distance d1 may correspond to about 200 μm.

A sealant 1350 for combining the array substrate 1100 with the color filter substrate 1200 is formed in the sealant area SA. The sealant 1350 positioned between the array substrate 1100 and the color filter substrate 1200 includes a photocurable material. Thus, when exposed to light, the sealant 1350 is cured to couple the array substrate 1100 to the color filter substrate 1200.

The sealant 1350 covers a portion of the gate driver 1160 formed in the sealant area SA. For example, the sealant 1350 may cover the interconnection unit 1162 and the second circuit unit 1166 of the gate driver 1160. Thus, when the sealant 1350 is disposed to cover a portion of the gate driver 1160, the parasitic capacitance that is usually generated between the common electrode 1220 of the color filter substrate 1200 and the gate driver 1160 is reduced.

The first circuit unit 1164 is spaced apart from the second circuit unit 1166 by the first distance d1 to prevent the sealant 1350 from covering the first circuit unit 1164 due to variance in process. Therefore, the first circuit unit 1164 is spaced apart from the sealant 1350 by a second distance d2 less than the first distance d1 in consideration of the variance in process. The second distance d2 may be about 50 μm.

The transistors of the first circuit unit 1 164 of the gate driver 1160 have a transistor size relatively larger than those of the transistors of the second circuit unit 1166. That is, the transistors of the first circuit unit 1164 take up more area than those of the transistors of the second circuit unit 1166.

Thus, when light is provided from a rear of the first substrate 1110 to cure the sealant 1350, the second circuit unit 1166 allows more light to pass therethrough than the first circuit unit 1164 so that an increased amount of light is provided to the sealant 350 formed above the second circuit unit 1166. The "rear" of the first substrate 1110 corresponds to the bottom of FIG. 12.

According to the exemplary embodiment of the present invention, the sealant is formed to cover the gate driver only in the interconnection unit and the second circuit unit in which more light provided from the rear of the first substrate is transmitted. Therefore, an increased amount of light may be provided to the sealant. As a result, the sealant is fully cured so that the array substrate and the color filter substrate may be firmly bound to each other by the sealant.

As described above, a reflector is formed in the first and second peripheral areas adjacent to the gate driver to reflect ultraviolet light provided from a rear of the first substrate so that the ultraviolet light reaches the sealant formed above the gate driver. The reflector may correspond to a reflective film having a predetermined incline angle. In addition, the reflector may have a plurality of reflective patterns spaced apart from one another by a predetermined distance.

According to the exemplary embodiments of the present invention, an increased amount of the ultraviolet light may be reflected by the reflector and provided to the sealant that is located above the gate driver. Accordingly, the sealant is fully cured by the ultraviolet light so that the binding force between the array substrate and the color filter substrate is increased.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A display device comprising:
   a display panel having a display area, a sealant area enclosing the display area, a first peripheral area positioned outside the sealant area and a second peripheral area disposed between the display area and the sealant area on a substrate;
   a circuit unit formed in the sealant area to provide the display panel with a driving signal to display an image;
   an insulation layer comprising a first portion, a second portion and a third portion, and covering the circuit unit, the first and second portions formed in the first and second peripheral areas respectively, the third portion formed between the first and second portions, and the first and second portions being inclined with respect to the third portion;

a binding member formed in the sealant area; and a reflective member comprising a first reflective film formed in the first peripheral area and a second reflective film formed in the second peripheral area, the first reflective film contacting the first portion, and the second reflective film contacting the second portion.

2. The display device of claim 1, wherein the display panel includes a reflective electrode for reflecting a natural light and a transparent electrode for transmitting an artificial light, and the reflective member includes a same material as the reflective electrode.

3. The display device of claim 1, wherein the reflective member includes a plurality of patterns, each of which forms an island pattern.

4. The display device of claim 3, wherein the display panel includes a switching element having first, second and third electrodes, and the reflective member includes a same material as the first electrode.

5. The display device of claim 3, wherein the display panel includes a switching element having first, second and third electrodes, and the reflective member includes a same material as the second and third electrodes.

6. The display device of claim 1;

wherein the display panel includes a gate line and a data line that are coupled to a switching element, and the circuit unit includes:

a first circuit unit coupled to the gate line and configured to provide the driving signal;

a second circuit unit configured to drive the first circuit unit; and an interconnection unit configured to provide a control signal for controlling the first and second circuit units, and wherein the reflective member covers the second circuit unit and the interconnection unit.

7. The display device of claim 1, wherein the organic film fully covers the circuit unit.

8. The display device of claim 1, wherein the binding member is not overlapped with the reflective member when viewed on a plan view.

9. The display device of claim 1, wherein the reflective member guides light to the binding member.

10. The display device of claim 1, wherein the circuit unit comprises a gate driver or a data driver.

11. The display device of claim 10, wherein the gate driver comprises a plurality of transistors and a plurality of wirings.

12. The display device of claim 1, wherein the insulation layer comprises an organic layer.

* * * * *